(12) United States Patent
Miyazawa et al.

(10) Patent No.: US 11,556,245 B2
(45) Date of Patent: *Jan. 17, 2023

(54) INFORMATION PROCESSING DEVICE, INFORMATION PROCESSING METHOD AND COMPUTER-READABLE RECORDING MEDIUM

(71) Applicant: SONY CORPORATION, Tokyo (JP)

(72) Inventors: Yusuke Miyazawa, Tokyo (JP); Ikuo Yamano, Tokyo (JP); Fuminori Homma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,227

(22) Filed: Aug. 11, 2020

(65) Prior Publication Data
US 2020/0387304 A1 Dec. 10, 2020

Related U.S. Application Data

(63) Continuation of application No. 16/299,442, filed on Mar. 12, 2019, now Pat. No. 10,776,003, which is a
(Continued)

(30) Foreign Application Priority Data

Feb. 24, 2010 (JP) ................. 2010-038778

(51) Int. Cl.
*G06F 3/0488* (2022.01)
*G06F 3/04886* (2022.01)
*G06F 3/04883* (2022.01)

(52) U.S. Cl.
CPC ...... *G06F 3/04886* (2013.01); *G06F 3/04883* (2013.01); *G06F 2203/04808* (2013.01)

(58) Field of Classification Search
CPC .. G06F 3/04883; G06F 3/04886; G06F 3/017; G06F 3/044; G06F 1/1626;
(Continued)

(56) References Cited

U.S. PATENT DOCUMENTS 6,359,270 B1 3/2002 Bridson
6,661,920 B1 * 12/2003 Skinner ............... G06F 3/04883
345/169

(Continued)

FOREIGN PATENT DOCUMENTS

CN 1761989 A 4/2006
CN 1881146 A 12/2006
(Continued)

OTHER PUBLICATIONS

Nov. 4, 2014, Chinese Office Action for related CN application No. 201110041298.7.

*Primary Examiner* — Hong Zhou
(74) *Attorney, Agent, or Firm* — Paratus Law Group, PLLC

(57) ABSTRACT

There is provided an information processing device including a detection unit for detecting a state of a manipulating body in a manipulation area, a state judgment unit for judging whether the manipulating body is in an input state in which a given input manipulation process is executed according to input information input by the manipulating body or in a standby state in which the input manipulation process is not executed, based on the detection result of the detection unit, and an execution process determination unit for determining a process to be executed from a plurality of processes including the input manipulation process based on the state judged by the state judgment unit or a change of the state.

17 Claims, 12 Drawing Sheets

FLOW OF MANIPULATION

Related U.S. Application Data continuation of application No. 13/028,595, filed on Feb. 16, 2011, now Pat. No. 10,235,041.

(58) Field of Classification Search
CPC ......... G06F 3/0416; G06F 2203/04101; G06F 2203/04808; G06F 3/04842
See application file for complete search history.

(56) References Cited

U.S. PATENT DOCUMENTS

| | | |
|---|---|---|
| 7,098,896 B2 | 8/2006 | Kushler et al. |
| 7,292,228 B2 | 11/2007 | Nagasaka et al. |
| 8,482,532 B2 | 7/2013 | Seo et al. |
| 8,552,987 B2 * | 10/2013 | Kuroume ............ G06F 3/04886 345/173 |
| 2008/0057926 A1 | 3/2008 | Forstall et al. |
| 2008/0316183 A1 | 12/2008 | Westerman et al. |
| 2009/0135147 A1 | 5/2009 | Hsu et al. |
| 2009/0160785 A1 | 6/2009 | Chen et al. |
| 2009/0167702 A1 | 7/2009 | Nurmi |
| 2009/0251423 A1 | 10/2009 | Jung |
| 2009/0256814 A1 | 10/2009 | Chung et al. |
| 2010/0004029 A1 | 1/2010 | Kim |
| 2010/0194692 A1 | 8/2010 | Orr et al. |
| 2011/0141027 A1 | 6/2011 | Ghassabian |

FOREIGN PATENT DOCUMENTS

| | | |
|---|---|---|
| CN | 101552818 A | 10/2009 |
| JP | 3149267 U | 3/2009 |

* cited by examiner

INFORMATION PROCESSING DEVICE, INFORMATION PROCESSING METHOD AND COMPUTER-READABLE RECORDING MEDIUM

CROSS REFERENCE TO PRIOR APPLICATION

This application is a continuation of U.S. patent application Ser. No. 16/299,442 (filed on Mar. 19, 2019), which is a continuation of U.S. patent application Ser. No. 13/028,595 (filed on Feb. 16, 2011 and issued as U.S. Pat. No. 10,235,041 on Mar. 19, 2019), which claims priority to Japanese Patent Application No. 2010-038778 (filed on Feb. 24, 2010), which are all hereby incorporated by reference in their entirety.

BACKGROUND OF THE INVENTION

Field of the Invention

The present invention relates to an information processing device, an information processing method, and a computer-readable recording medium.

Description of the Related Art

With the increase in devices with touch panels, a touch panel capable of detecting a proximity state to a manipulation surface of the touch panel and a measurement device capable of measuring pressing force against the manipulation surface have been recently developed. Use of such a device in several scenes such as manipulation information input has been considered. For example, a mouse for detecting a proximity state of a user's hand to a mouse surface and judging whether the mouse is being manipulated to perform power-off for power saving is disclosed in Japanese Utility Model No. 3149267.

SUMMARY OF THE INVENTION

However, in Japanese Utility Model No. 3149267, a judgment is made as to whether a mouse is being manipulated based on a movement of a hand holding the mouse to manipulate the mouse, and a change of an input state in a contact manner is not detected.

In light of the foregoing, it is desirable to provide an information processing device, an information processing method, and a computer-readable recording medium which are novel and improved and which are capable of reducing a user manipulation load by actively using a change of an input state due to operation of a manipulating body.

According to an embodiment of the present invention, there is provided an information processing device including a detection unit for detecting a state of a manipulating body in a manipulation area, a state judgment unit for judging whether the manipulating body is in an input state in which a given input manipulation process is executed according to input information input by the manipulating body or in a standby state in which the input manipulation process is not executed, based on the detection result of the detection unit, and an execution process determination unit for determining a process to be executed from a plurality of processes including the input manipulation process based on the state judged by the state judgment unit or a change of the state.

According to the present invention, the judgment is made as to whether the manipulating body is in an input state in which the input information is input by the manipulating body or in the standby state based on the state of the manipulating body. A process to be executed is determined based on the state of the manipulating body or a change of the state. Accordingly, it is possible to reduce a load of the user input manipulation since a plurality of processes can be executed in a series of manipulations.

Here, the execution process determination unit may execute a first input manipulation process when the manipulating body is in the input state, and may execute a second input manipulation process when a state of the manipulating body is changed from the input state to the standby state.

Moreover, the execution process determination unit may execute a character input process to input a character to a given input area when the manipulating body is in the input state, and may execute a space input process to input a space next to the character input through the character input process when the manipulating body is changed from the input state to the standby state.

Furthermore, when the space input process is executed, the execution process determination unit further may execute a spell check process for a previously input character string.

Moreover, the execution process determination unit may execute a character input process to input a character to a given input area when the manipulating body is in the input state, and may execute an input area movement process to move the input area where character input is performed to a next input area when the manipulating body is changed from the input state to the standby state.

Furthermore, the execution process determination unit may execute different input manipulation processes according to a movement of the manipulating body when a state is changed from the input state to the standby state.

The information processing device may include a notification unit for notifying a user that the process determined by the execution process determination unit is executed when the process is executed.

Furthermore, the detection unit is capable of detecting proximity and contact of the manipulating body to and with a manipulation surface on which information input is performed, and the state judgment unit may judge that the manipulating body is in the input state when the manipulating body is in proximity to or in contact with the manipulation surface, and may judge that the manipulating body is in the standby state when the manipulating body is separated front the manipulation surface above a given distance at which the manipulating body is judged to be in proximity to the manipulation surface.

Moreover, the execution process determination unit may execute different input manipulation processes according to whether the manipulating body is in proximity to the manipulation surface or in contact with the manipulation surface.

Furthermore, the detection unit is capable of detecting contact of the manipulating body with a manipulation surface on which information input is performed, and pressing force of the manipulating body against the manipulation surface, and the state judgment unit may judge that the manipulating body is in the input state when the manipulating body is in contact with the manipulation surface, and may judge that the manipulating body is in the standby state when the manipulating body is separated from the manipulation surface.

Moreover, the execution process determination unit may execute different input manipulation processes according to a size of the pressing force of the manipulating body against the manipulation surface.

According to another embodiment of the present invention, there is provided an information processing method including detecting a state of a manipulating body in a manipulation area, judging whether the manipulating body is in an input state in which a given input manipulation process is executed according to input information input by the manipulating body or in a standby state in which the input manipulation process is not executed, based on the result of the detection, and determining a process to be executed from a plurality of processes including the input manipulation process based on the judged state of the manipulating body or a change of the state.

According to another embodiment of the present invention, there is provided a computer-readable recording medium having a program recorded thereon for causing a computer to function as an information processing device including a detection unit for detecting a state of a manipulating body in a manipulation area, a state judgment unit for judging whether the manipulating body is in an input state in which a given input manipulation process is executed according to input information input by the manipulating body or in a standby state in which the input manipulation process is not executed, based on the detection result of the detection unit, and an execution process determination unit for determining a process to be executed front a plurality of processes including the input manipulation process based on the state judged by the state judgment unit or a change of the state.

The computer program is stored in a storage device included in the computer, and it is read and executed by a CPU included in the computer, thereby causing the computer to function as the information processing device described above. Moreover, there is also provided a computer readable recording medium in which the computer program is stored. The recording medium may be a magnetic disk, an optical disk and the like, for example.

As described above, according to the present invention, it is possible to provide an information processing device, an information processing method, and a computer-readable recording medium capable of reducing a user manipulation load by actively using a change of an input state due to operation of the manipulating body.

DETAILED DESCRIPTION OF THE EMBODIMENT(S)

Figure 1:
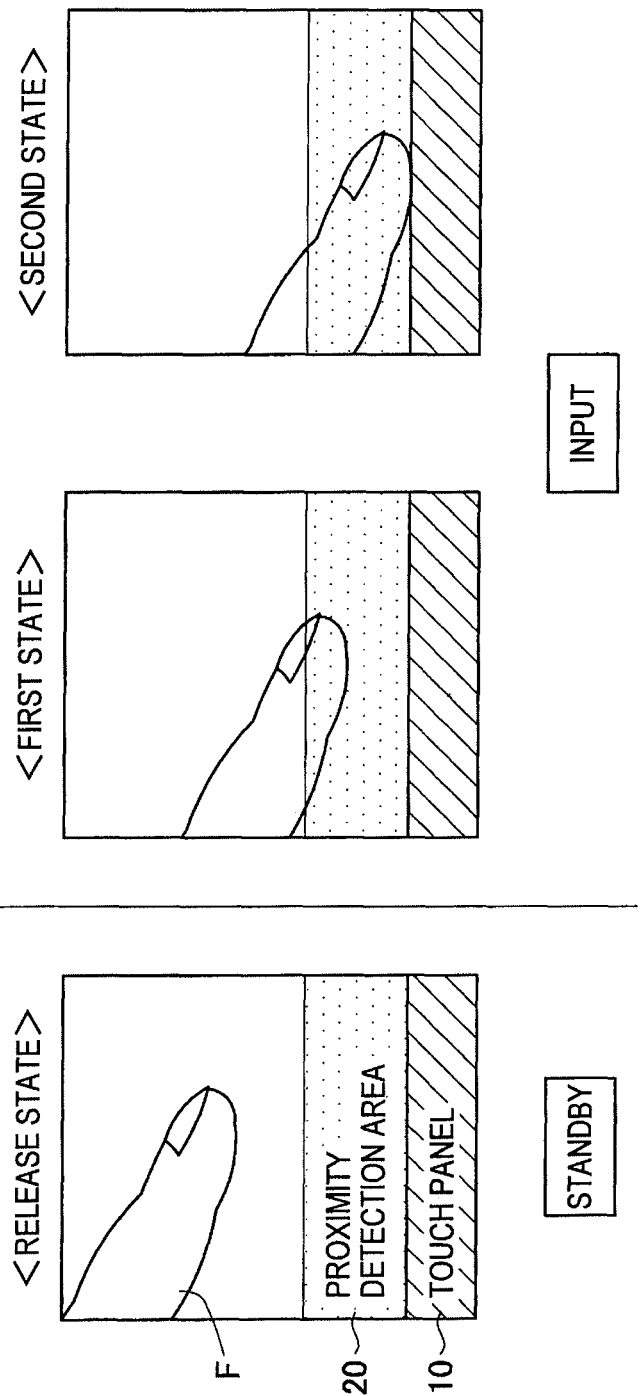
FIG. 1 is an illustrative diagram showing a detection pattern in an information processing device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, a description will be given in the following order.
1. First embodiment (example in which proximity and contact of the manipulating body are detected)
2. Second Embodiment (example in which contact and pressing force of the manipulating body are detected)
3. Others (execution of space input and input area movement, malfunction prevent ion process, and configuration of detection unit)

1. First Embodiment

Description of Input Detection Pattern

First, a detection pattern of a manipulating body relative to a manipulation surface in an information processing device according to a first embodiment of the present invention will be described with reference to FIG. 1. FIG. 1 is an illustrative diagram showing a detection pattern in the information processing device according to the present embodiment.

The information processing device according to the present embodiment includes a detection unit capable of detecting proximity and contact of a manipulating body to and with the manipulation surface. The information processing device judges whether a user is inputting manipulation information based on the detection result of the detection unit, and enables a manipulation according to the judgment result.

In the present embodiment, three input states judged by the information processing device are defined as shown in FIG. 1. First, a state in which the finger F is separated vertically upward from the surface of the touch panel 10 (manipulation surface) by a given distance is defined as a release state. Further, a state in which the finger F does not contact the surface of the touch panel 10 but is located in a proximity detection area 20 separated vertically upward from the surface of the touch panel 10 by a given distance is defined as a first state. A state in which the finger F contacts the surface of the touch panel 10 is defined as a second state. Further, a state in which the finger F is in the release state is defined as a standby state, and a state in which the finger F is in the first state and the second state is defined as an input state.

The information processing device detects a position relationship between the finger F and the surface of the touch panel 10 using the detection unit and judges one of the three states. Each state or a change of the state is associated with a given input manipulation, and the information processing device executes an input manipulation corresponding to the state of the finger F. Accordingly, the user can switch the input manipulation by making the finger F in proximity to the surface of the touch panel 10 or releasing the finger F from the surface of the touch panel 10. Thus, enabling a plurality of input manipulations in a series of operations to change the position of the finger F reduces a user manipulation load. Hereinafter, a configuration of such an information processing device and a manipulation process in the information processing device will be described in detail.

Hardware Configuration of Information Processing Device

Figure 2:
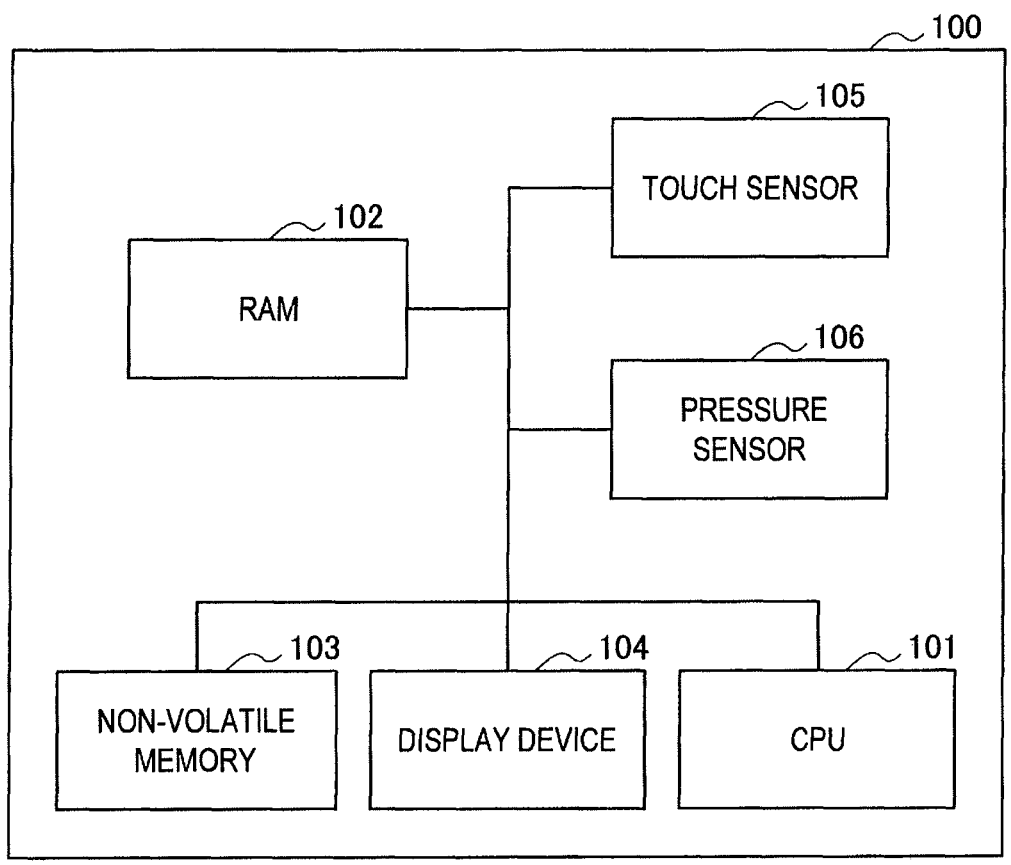
FIG. 2 is a block diagram showing a hardware configuration of the information processing device according to the first embodiment.

First, a hardware configuration example of the information processing device 100 according to the present embodiment will be described with reference to FIG. 2. FIG. 2 is a block diagram showing a hardware configuration of the information processing device 100 according to the present embodiment.

The information processing device 100 according to the present embodiment includes a central processing unit (CPC) 101, a random access memory (RAM) 102, and a non-volatile memory 103, as shown in FIG. 2. The information processing device 100 further includes a display device 104, a touch sensor 105, and a pressure sensor 106.

The CPU 101 functions as an arithmetic processing device and a control device, and controls entire operation of the information processing device 100 according to various programs. Further, the CPU 101 may be a microprocessor. The RAM 102 temporarily stores programs used for execution of the CPU 10, parameters that are properly changed in the execution, and the like. These are connected to each other by a host bus, including a CPU bus. The non-volatile memory 103 stores programs, operation parameters and the like used by the CPU 101. The non-volatile memory 103 may be, for example, a read only memory (ROM) or a flash memory.

The display device 104 is an example of an output device for outputting information. The display device 104 may be, for example, a cathode ray tube (CRT) display device, a liquid crystal display (LCD) device, or an organic light emitting diode (OLED) device.

The touch sensor 105 is one example of an input device for enabling the user to input information, and includes an input unit for inputting information, and an input control circuit for generating an input signal based on the input by the user and outputting the input signal to the CPU 101. The touch sensor 105 according to the present embodiment may detect a proximity or contact state of a manipulating body to or with the manipulation surface, for example, based on a change in capacitance according to a position of a manipulating body on a manipulation surface. The user may input various data to the information processing device 100 or instruct the information processing device 100 to perform processing operations by manipulating the touch sensor 105. Further, the pressure sensor 106 is one example of the input device for enabling the user to input information and is a sensor for detecting pressing force with which the user presses by the manipulating body. The pressure sensor 106 converts the detected pressing force into an electrical signal and outputs the electrical signal as the detection result.

The touch sensor 105 and the pressure sensor 106 of the information processing device 100 according to the present embodiment are a sensor unit for detecting input of manipulation information to move display information. A sensor unit including the touch sensor 105 and the pressure sensor 106 is stacked with the display device 104. The information processing device 100 according to the present embodiment may include at least the touch sensor 105 in the sensor unit.

Functional Configuration of Information Processing Device

Figure 3:
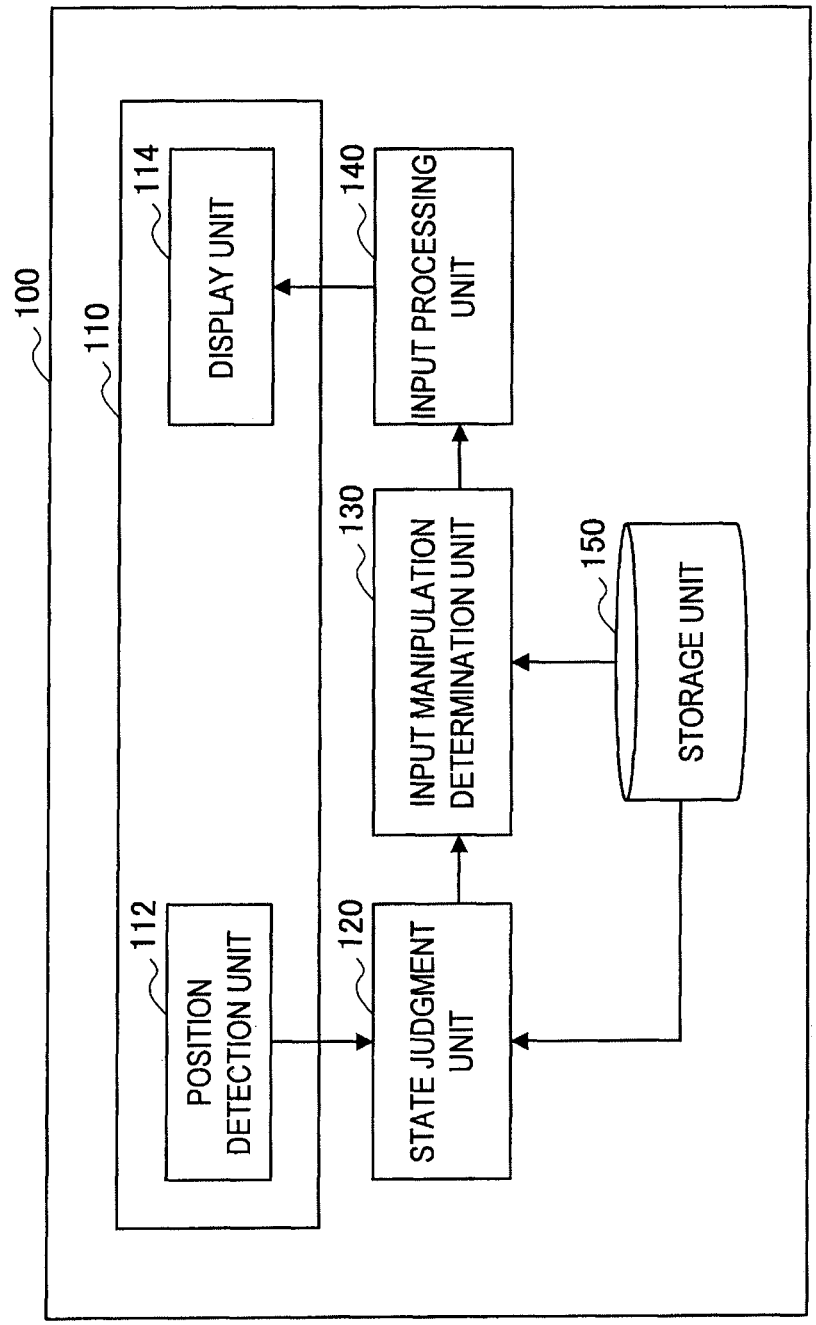
FIG. 3 is a block diagram showing a functional configuration of the information processing device according to the first embodiment.

Next, a functional configuration of the information processing device 100 according to the present embodiment will be described with reference to FIG. 3. FIG. 3 is a block diagram showing a functional configuration of the information processing device 100 according to the present embodiment. The information processing device 100 according to the present embodiment includes an input display unit 110, a state judgment unit 120, an input manipulation determination unit 130, an input processing unit 140, and a storage unit 150, as shown in FIG. 3.

The input display unit 110 is a functional unit for displaying information and inputting information, and includes a position detection unit 112 and a display unit 114. The position detection unit 112 corresponds to the touch sensor 105 of FIG. 2 and detects a capacitance value changed according to whether the manipulating body is in proximity to or in contact with a manipulation area in which the position detection unit 112 is provided. As the manipulating body comes in proximity to the display surface, the capacitance detected by the position detection unit 112 increases and when the manipulating body is in contact with the display surface, the capacitance value reaches a maximum value. It can be judged that the manipulating body is located in proximity to the display surface when the detected capacitance value of the position detection unit 112 exceeds the first capacitance value, and that the manipulating body is in contact with the display surface when the capacitance value exceeds the second capacitance value. The position detection unit 112 outputs the detected capacitance value as the detection result to the state judgment unit 120.

The display unit 114 is an output device corresponding to the display device 104 of FIG. 2, and displays information that is display-processed by the input processing unit 140.

The state judgment unit 120 judges a position state of the manipulating body relative to the manipulation surface based on the detection result input from the position detection unit 112. When the capacitance value as the detection result from the position detection unit 112 is input, the state judgment unit 120 judges whether the manipulating body is in a release state, the first state or the second state shown in FIG. 1 based on a size of the capacitance value. The state judgment unit 120 refers to the first capacitance value as a capacitance value at a boundary of the proximity detection area 20 and the second capacitance value indicating a capacitance value in the contact state, which are stored in the storage unit 150, and compares the first and second capacitance values with the capacitance value detected by the position detection unit 112. Based on a size relationship therebetween, the state judgment unit 120 may judge a position state of the manipulating body. The state judgment unit 120 outputs the determination result to the input manipulation determination unit 130.

The input manipulation determination unit 130 determines an input manipulation to be executed, based on the judgment result input from the state judgment unit 120. The input manipulation determination unit 130 specifies an input manipulation corresponding to a position state or a change of the state of the manipulating body by referring to the storage unit 150, and determines execution of the input manipulation. The input manipulation determination unit 130 outputs the determined information to the input processing unit 140.

The input processing unit 140 performs a process for executing the input manipulation. The input processing unit 140 executes the input manipulation determined by the input manipulation determination unit 130 based on the input information input from the input display unit 110. When information displayed on the display unit 114 is changed by execution of the input manipulation, display-processed information is output from the input processing unit 140 to the display unit 114.

The storage unit 150 corresponds to the non-volatile memory 103 shown in FIG. 2, and stores various set information used to determine the input manipulation to be executed. The set information includes, for example, the first capacitance value and the second capacitance value for judging the position state of the manipulating body relative to the manipulation surface, correspondence information indicating correspondence between the position state of the manipulating body and the input manipulation, and so on. Further, the information processing device 100 may include a memory (not shown) for temporarily storing information when the input manipulation process is performed. For example, position state information indicating the position state of the manipulating body is stored in the memory.

Input Manipulation Process According to Position State

Figure 4:
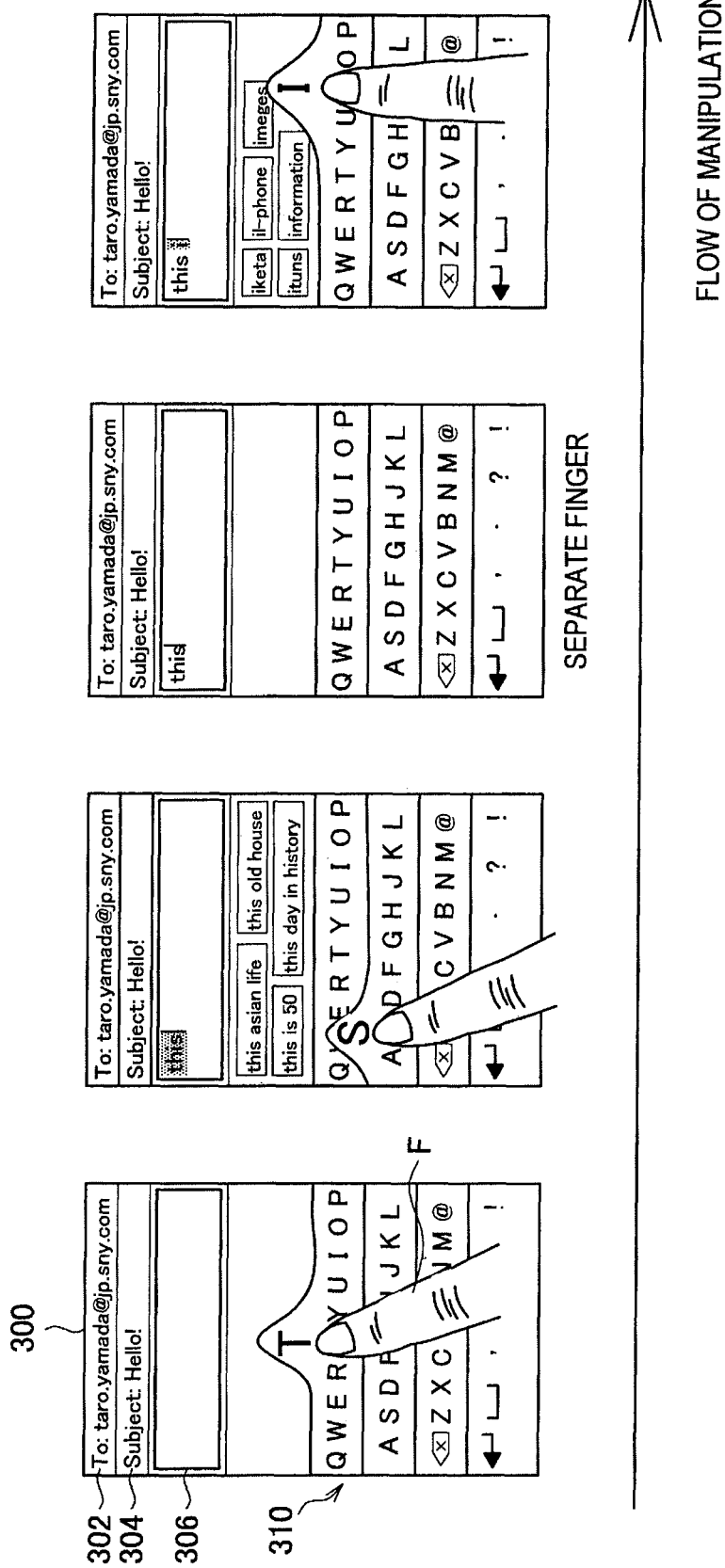
FIG. 4 is an illustrative diagram showing one example of an input manipulation process using the information processing device according to the first embodiment.
Figure 5:
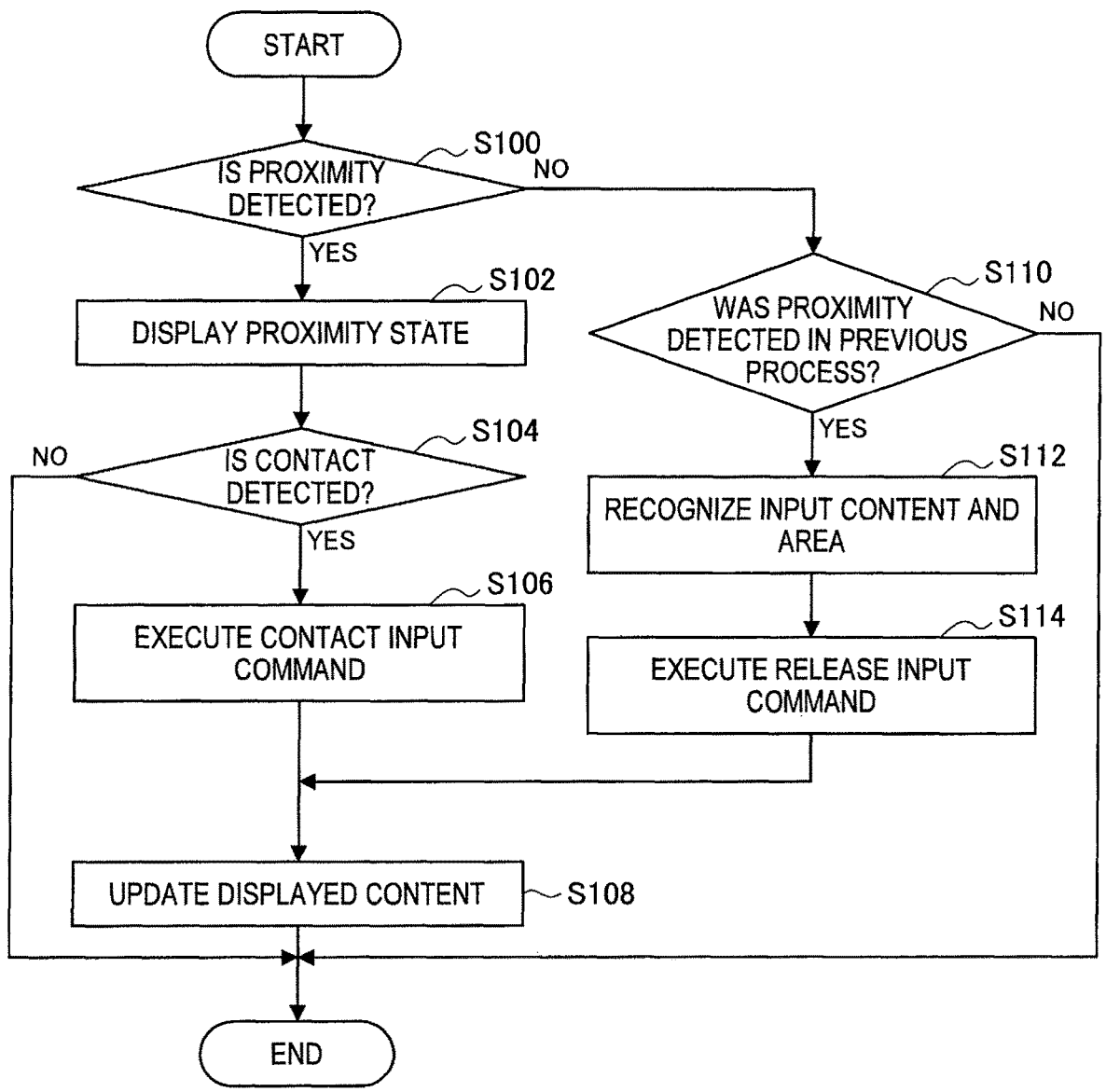
FIG. 5 is a flowchart showing an input manipulation process using the information processing device according to the first embodiment.
Figure 6:
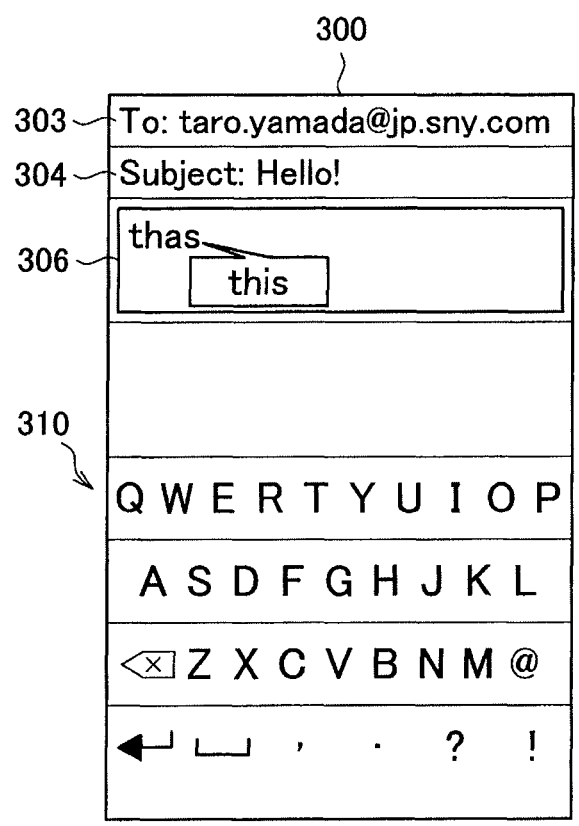
FIG. 6 is an illustrative diagram showing a display example of a character siring of a modification candidate displayed in an input area together with space input.
Figure 7:
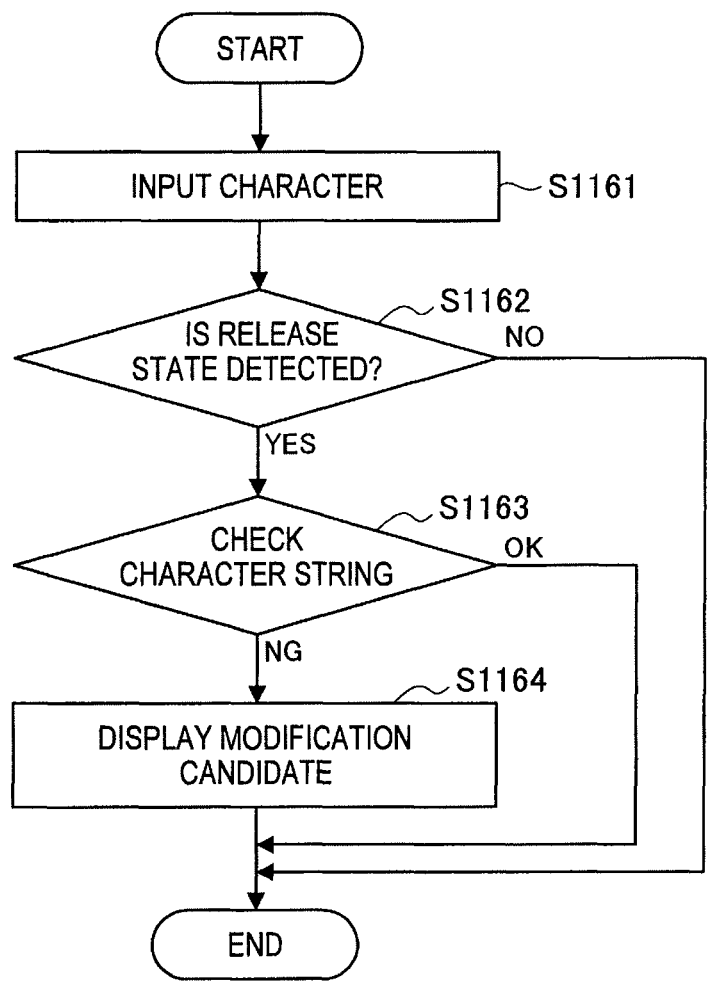
FIG. 7 is a flowchart showing a spell check process.
Figure 8:
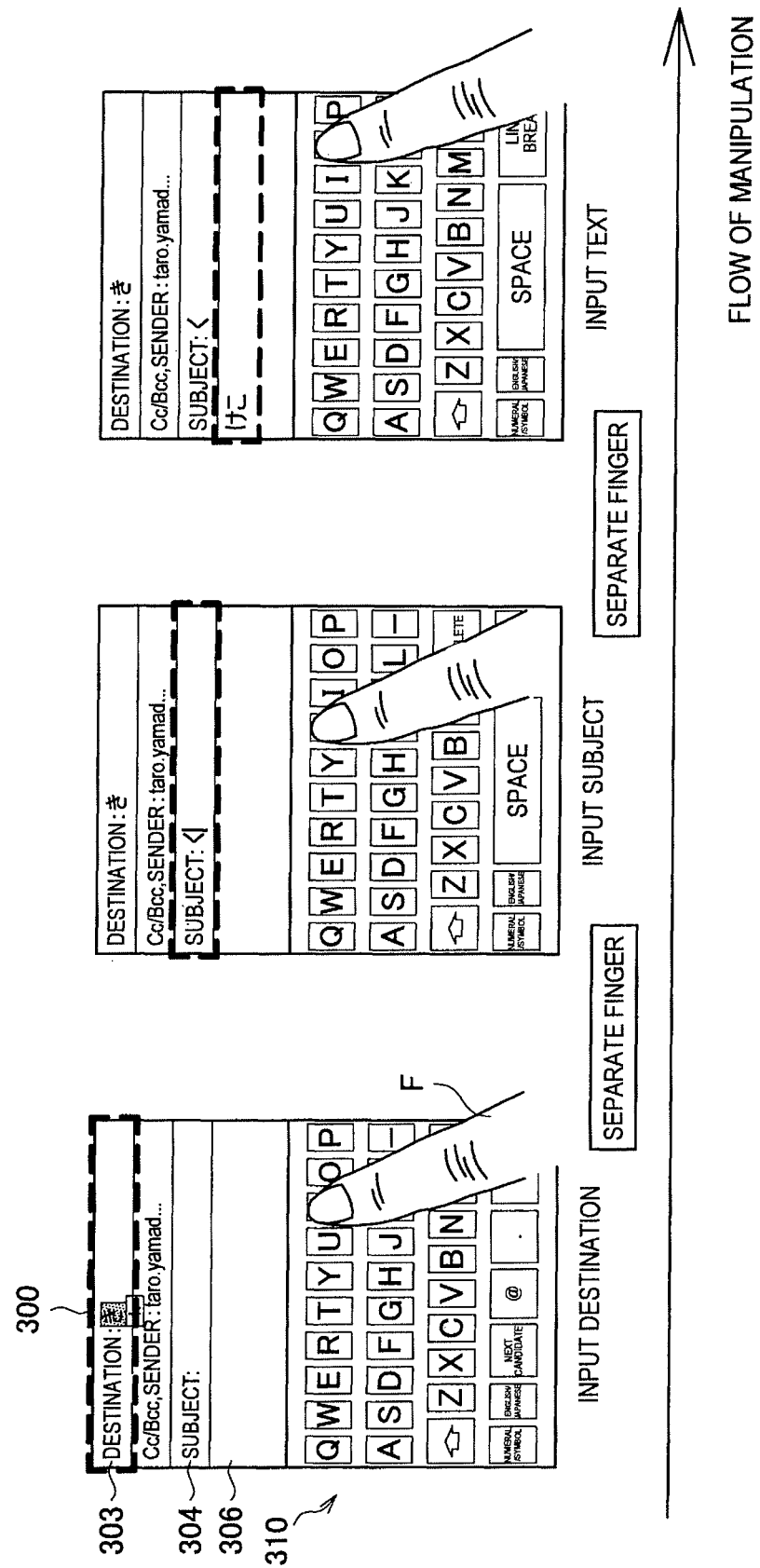
FIG. 8 is an illustrative diagram showing another example of the input manipulation process using the information processing device according to the first embodiment.
Figure 9:
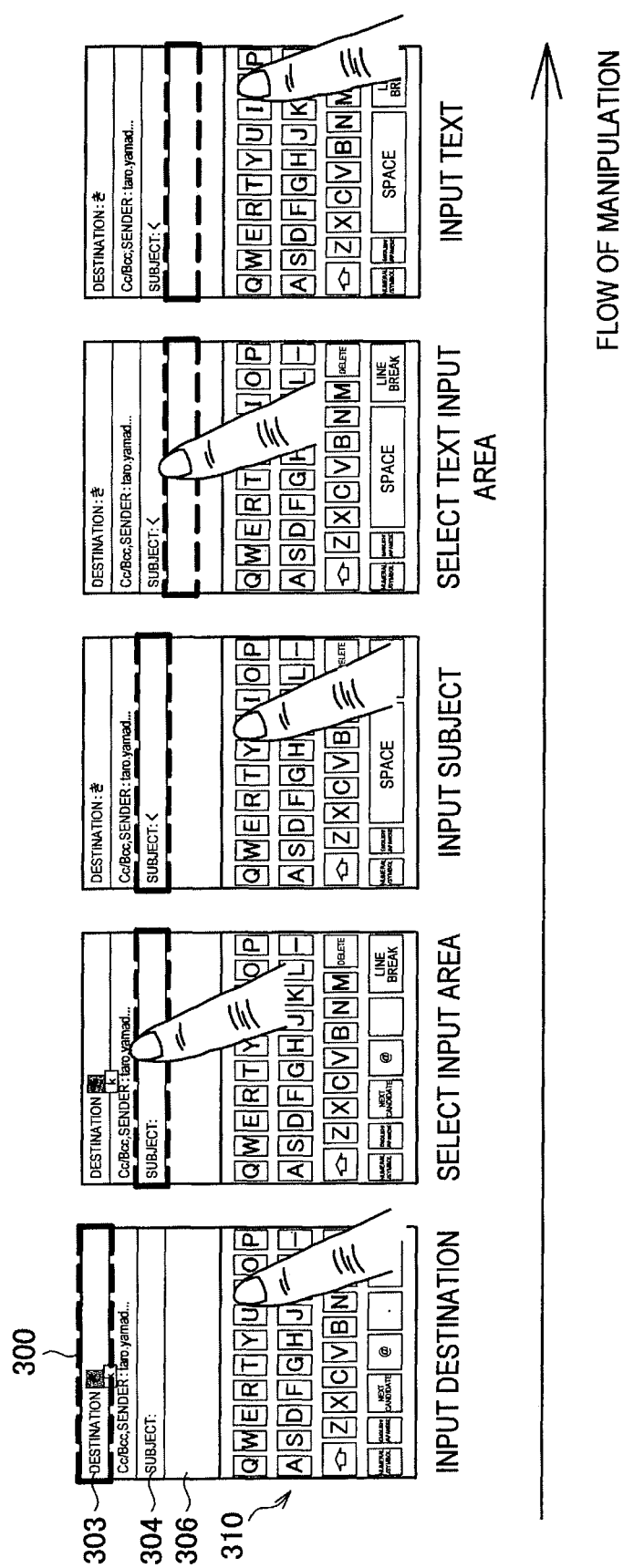
FIG. 9 is an illustrative diagram showing a case in which an input manipulation shown in FIG. 6 is executed by an input manipulation process in a related art.

Next, an input manipulation process using the information processing device 100 according to the present embodiment will be described with reference to FIGS. 4 to 9. FIG. 4 is an illustrative diagram showing one example of an input manipulation process using the information processing device 100 according to the present embodiment. FIG. 5 is a flowchart showing an input manipulation process using the information processing device 100 according to the present embodiment. FIG. 6 is an illustrative diagram showing a display example of a character string of a modification candidate displayed in an input area together with space input. FIG. 7 is a flowchart showing a spell check process. FIG. 8 is an illustrative diagram showing another example of the input manipulation process using the information processing device 100 according to the present embodiment. FIG. 9 is an illustrative diagram showing a case in which an input manipulation shown in FIG. 6 is executed by an input manipulation process in a related art.

Sentence Input Using Input Manipulation Process

In the present embodiment, an input manipulation corresponds to each of the release state, the first state, and the second state shown in FIG. 1. Accordingly, a plurality of input manipulations can be executed in a series of operations to move the manipulating body. For example, a case in which a sentence is input in an information terminal including the input display unit 300 as shown in FIG. 4 is considered. FIG. 4 shows a process of producing an electronic mail. A destination input area 302, a subject input area 304, and a text input area 306 are provided in an input display unit 300. Further, a software keyboard 310 is provided as a character input means.

Characters such as letters are arranged on the software keyboard 310, as shown in FIG. 4. For example, a manipulating body such as the finger F contacts a key corresponding to each character, such that an input of the corresponding character is selected and the contacted finger F is released from the key, such that the input of the selected character is determined. In such a manipulation, the key selected by the finger F may not be visible. Accordingly, when the finger F is in proximity to the key, the software keyboard 310 according to the present embodiment displays the key to protrude toward a finger tip of the finger F, thereby improving input manipulability.

When characters are input using such a software keyboard 310, the characters to be input are input one by one or a prediction conversion candidate predicted from previously input characters is selected to input a character string. In a related art, a sentence is input by selecting a space key to input the space and then inputting a next character string. In such an input manipulation, a character, a character string, or a space to be input must all be selected with the finger F, requiring an input period of time.

In the information processing device 100 according to the present embodiment, the position state of the finger F relative to the manipulation surface may be detected by the position detection unit 112 and the input manipulation according to the position state may be executed. The position states are three states of the release state, the first state, and the second state, as shown in FIG. 1. In the present embodiment, in sentence input, a space input manipulation corresponds to a change from the input state (the first state and the second state) to the standby state (release state), thereby reducing the load of the input manipulation. Hereinafter, the input manipulation process will be described with reference to the flowchart of FIG. 5.

The detection result is input front the position detection unit 112 to the state judgment unit 120 of the information processing device 100 at a given timing. When the detection result is input, the state judgment unit 120 judges whether the finger F is in a proximity state to the manipulation surface (step S100). The state judgment unit 120 refers to a position separate from the manipulation surface by a given distance, i.e., a first capacitance value as a capacitance value in a boundary position of the proximity detection area, which is stored in the storage unit 150, and compares the first capacitance value with the detection result of the position detection unit 112.

When the detection result is greater than the first capacitance value, the finger F is regarded as being present in the proximity detection area and being in proximity to the manipulation surface, and the proximity state (the first state) is displayed (step S102). In the proximity state, in the present embodiment, a key to which the finger F is in the closest proximity on the software keyboard 310 may be displayed to protrude toward a finger tip of the finger F. In this case, the state judgment unit 120 stores information indicating that the finger F is in a proximity state, as position state information, in a memory (not shown). The position state information is information indicating the position state of the finger F when each input manipulation process is executed, and is history-managed.

Further, the state judgment unit 120 judges whether the finger F is in contact with the manipulation surface (step S104). The state judgment unit 120 refers to the second capacitance value as a capacitance value when the manipulating body contacts the manipulation surface, which is stored in the storage unit 150, and compares the second capacitance value with the detection result of the position detection unit 112. When the detection result is greater than the second capacitance value, the state judgment unit 120 judges that the finger F is in a contact state (the second state) in which the finger F contacts the manipulation surface, and executes a contact input command (step S106).

The contact input command is an instruction for executing an input manipulation, which is executed when the finger F contacts the manipulation surface. When the state judgment unit 120 judges that the finger F contacts the manipulation surface, the input manipulation determination unit 130 having received the judgment result specifies an input manipulation to be executed when the position state of the finger F is the contact state, by referring to the storage unit 150, and instructs the input processing unit 140 to execute such an input manipulation. In the present embodiment, when the finger F is in a contact state, a diameter of a key that the finger F contacts is selected. When the character is selected, the input processing unit 140 displays the selected character on the display unit 114 to update displayed content (step S108). In this case, the state judgment unit 120 updates the position state information stored in the memory (not shown) to record that the finger F is in the contact state. When it is judged in step S104 that the finger F is not in the contact state, the process is terminated with the proximity state being displayed.

Returning to step S100, when the detection result of the position detection unit 112 is equal to or smaller than the first capacitance value, the state judgment unit 120 judges that the finger F is separated from the manipulation surface above a given distance and located out of the proximity detection area 20. In this case, the state judgment unit 120 stores information indicating that the finger F is in the release state, as position state information, in a memory (not shown). The state judgment unit 120 confirms whether the finger F has been in a proximity state in a previous input manipulation process (step S110). The state judgment unit 120 may confirm whether the finger F has been in the proximity state in the previous input manipulation process based on the position state information stored in the memory. When the finger F has been in a proximity state in the previous input manipulation process, the input manipulation determination unit 130 judges that the position state of the finger F has changed from the proximity state to the release state and specifies an input manipulation to be executed in the relevant situation by referring to the storage unit 150.

In the present embodiment, when the finger F is located in the release state, a space input manipulation is executed. Here, the input processing unit 140 recognizes the previously input content and the input area (step S112). A space input position is recognized by recognizing the input area. Further, it can be confirmed whether a character string including the input characters is a meaningful character string by recognizing the input content. Accordingly, when the meaningful character string is input and the finger F is in the release state, space input is caused to be performed, thus preventing the space from being carelessly input in a state during character input.

Thus, the input processing unit 140 executes a release input command, which is an instruction for executing an input manipulation executed when the finger F comes into the release state (step S114), and inputs a space to the input area of the display unit 114 (step S108). On the other hand, when it is judged in step S110 that the finger F is in the release state even in the previous input manipulation process, the position state of the finger F is not changed and, accordingly, the process is terminated without updating the displayed content. The input manipulation process shown in FIG. 5 is repeatedly performed each time the detection result is input from the position detection unit 112 to the state judgment unit 120.

An input manipulation process in the information processing device 100 according to the present embodiment has been described. Through such an input manipulation process, for example, in the example shown in FIG. 4, when a sentence is input to the text input area 306, the finger F contacts a character to be input on the software keyboard 310 to select the character and the finger F is separated from the manipulation surface to determine the character. In this case, it is noted that the finger F does not deviate from the proximity detection area 20. For example, when a character string "This" is input and then the space is input, the finger F comes into the release state, such that the space can be input without selecting the space key. Then, the finger F contacts a key of the character to be input next, such that character input can be performed subsequent to the space. Thus, the space input manipulation corresponds to an operation for changing the position state of the linger F to release the finger F, thereby reducing a load of an input manipulation to select a key.

Here, as in the present example, when the space input is performed through the input manipulation process of the present embodiment, the spelling of an input character string may be checked simultaneously with the space input to display a character string of a modification candidate or an input candidate. The spell check is executed following step S114 of FIG. 5.

Such a spell check process will be described with reference to FIGS. 6 and 7. A user performs character input according to the flowchart of FIG. 5 (step S1161). Each time, the information processing device 100 judges whether the finger F is changed from the input state for the character input to the release state (standby state) (step S1162). Step S1162 corresponds to step S110 of FIG. 5. In this case, when it is judged that the position state of the finger F is not changed, the process of FIG. 5 is terminated without execution of the spell check process. On the other hand, when it is judged in step S1162 that the position state of the finger F has been changed, the spell check is performed on the input character string (step S1163).

For example, it is assumed that the user inputs a character string "thas," as shown in FIG. 6. Then, the information processing device 100 having detected that the finger F is released from the manipulation surface above a given distance such that the finger F has been changed from the input state to the standby state performs the spell check on the input character string "thas." When it is judged that the spelling of the input character string is correct as a result of the spell check, a conversion candidate is not displayed, the process shown in FIG. 7 is terminated, and the process of FIG. 5 is also terminated. On the other hand, when it is judged that the spelling of the input character string is erroneous, character strings of modification candidates are displayed in the input area, e.g. near the character string of a judgment object (step S1164). One or a plurality of character strings of the modification candidates are displayed, for example, by pop-up. The spell check may be performed using an existing check method.

The user confirms the character strings displayed as the modification candidates. When there is a character string desired to be input instead of the current input character string, the finger F contacts the character string of the modification candidate to select the character string, such that the character string input to the input area is substituted with the character string of the modification candidate. Thus, when a sentence is input, the spell check is performed on the input character string at a timing when the space is input in a boundary between words. Accordingly, the modification candidate is displayed at a proper timing and The input character string can be readily converted into a correct character string, thereby reducing the user input load.

Even in the case in which the character string of the input candidate is displayed following the spell check, when the user changes the position state of the finger F from the input state to the standby state, character strings entirely or partially matching the character string that is input so far are extracted from the word dictionary stored in the information processing device 100 in advance. The character strings are displayed on the display unit 114 in a given order (e.g., alphabetical order, order of short character strings or order of high use frequency), and are presented to the user. By doing so, it is possible to reduce the user input load.

Movement of Input Area Using Input Manipulation Process

A process of moving the input area (active input area) where a character is allowed to be input among a plurality of input areas may be executed using the input, manipulation process of the present embodiment shown in FIG. 5, as is performed when a tab key of the keyboard is pressed. When there are a plurality of input areas, one selected input area is activated and a character is allowed to be input to only the input area.

For example, a case in which an electronic mail is transmitted using an information terminal is considered. In this case, an electronic-mail transmission format including an electronic-mail destination input area 302, a subject input area 304, and a text input area 306 is displayed on the input display unit 300 of the information terminal, as shown in FIG. 8. Further, a software keyboard 310 for inputting information to the input areas is provided in the input display unit 300.

In order to input information to each input area of such a transmission format, a related art may require a manipulation in which the finger F contacts an input area for inputting information to select an input area to be activated, as shown in FIG. 9. For example, first, the finger F contacts the destination input area 302 in order to input a destination and then the destination is input using the software keyboard 310. When the destination input is completed, the finger F contacts the subject input area 304 in order to subsequently input a subject, and the subject is input using the software keyboard 310. Then, the finger F contacts the text input area 306 in order to input text, and text input is initiated using the software keyboard 310. Thus, in a related art, since the finger F contacts the input area for inputting information to select the input area, movement of the finger F between the software keyboard 310 and the input area increases and manipulability is degraded.

In the present embodiment, the input manipulation process using the information processing device 100 is applied such that an input manipulation to move an input area to be activated according to the position state and the change of the state of the finger F relative to the manipulation surface is executed. Even in the present example, the state judgment unit 120 of the information processing device 100 can detect the three states shown in FIG. 1 based on the detection result of the position detection unit 112. Here, the release state in which the finger F is separated from the manipulation surface by a given distance is defined as a standby state, and the first state in which the finger F is in proximity to the manipulation surface and the second state in which the finger F contacts the manipulation surface are defined as input states. The character input using the software keyboard 310 may be performed when the finger F is in the input state. When the information processing device 100 is changed from the input state to the standby state, the manipulation to move the input area to be activated may be executed.

In the example shown in FIG. 8, an input area to be activated among the destination input area 302, the subject input area 304, and the text input area 306 is moved. In this case, the order to determine the active input area through the input area movement manipulation is set and stored in the information processing device 100 in advance. In the present embodiment, it is assumed that the active input area is moved in order of the destination input area 302, the subject input area 304, and the text input area 306.

A character is input to the destination input area 302 using the software keyboard 310. and then the user separates the finger F from the manipulation surface above a given distance so that the finger F comes into the standby state. In this case, since the position state of the finger F is changed from the input state to the standby state, the input manipulation determination unit 130 of the information processing device 100 instructs the input processing unit 140 to set the subject input area 304 as the active input area. The input processing unit 140 performs a display process to set the input area as the subject input area 304 and displays it on the display unit 114.

When the subject input area 304 becomes the active input area, the user similarly inputs a subject to the subject input area using the software keyboard 310. When the input is terminated, the finger F is moved to the standby state. Accordingly, the text input area 306 is activated so that the user can input a character to the text input area 306. Thus, the input area movement manipulation can be performed by moving the position of the finger F between the input state and the standby state on the software keyboard 310 instead of moving the finger F from the software keyboard 310 to the input area.

The information processing device 100 according to the present embodiment and the input manipulation process using the information processing device 100 have been described. According the present embodiment, the position detection unit 112 capable of defecting proximity and contact of the manipulating body to and with the manipulation surface is included so that the input manipulation is executed according to the position state of the manipulating body. Accordingly, it is possible to reduce the load of the input manipulation.

2. Second Embodiment

Figure 11:
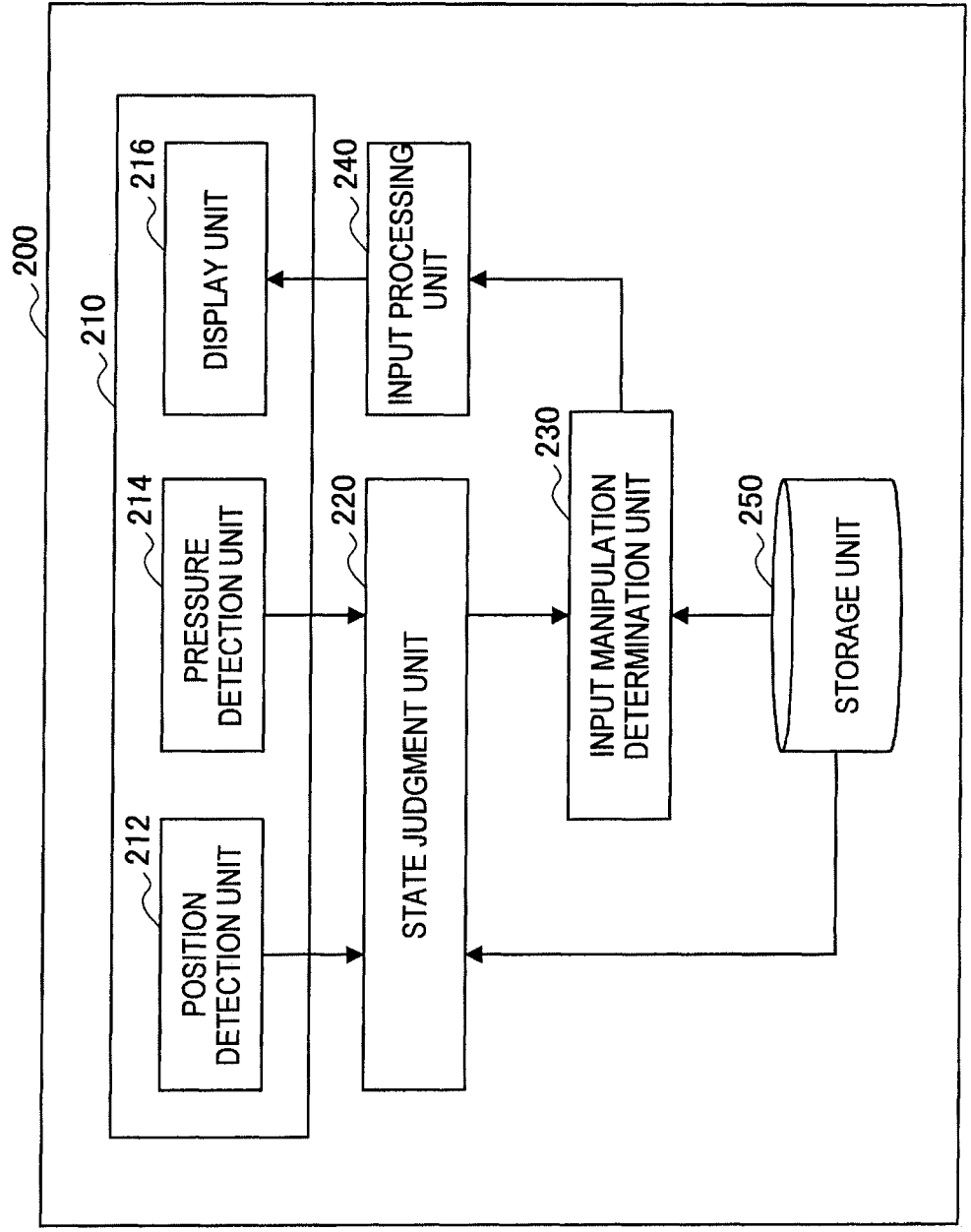
FIG. 11 is a block diagram showing a functional configuration of the information processing device according to the second embodiment.
Figure 12:
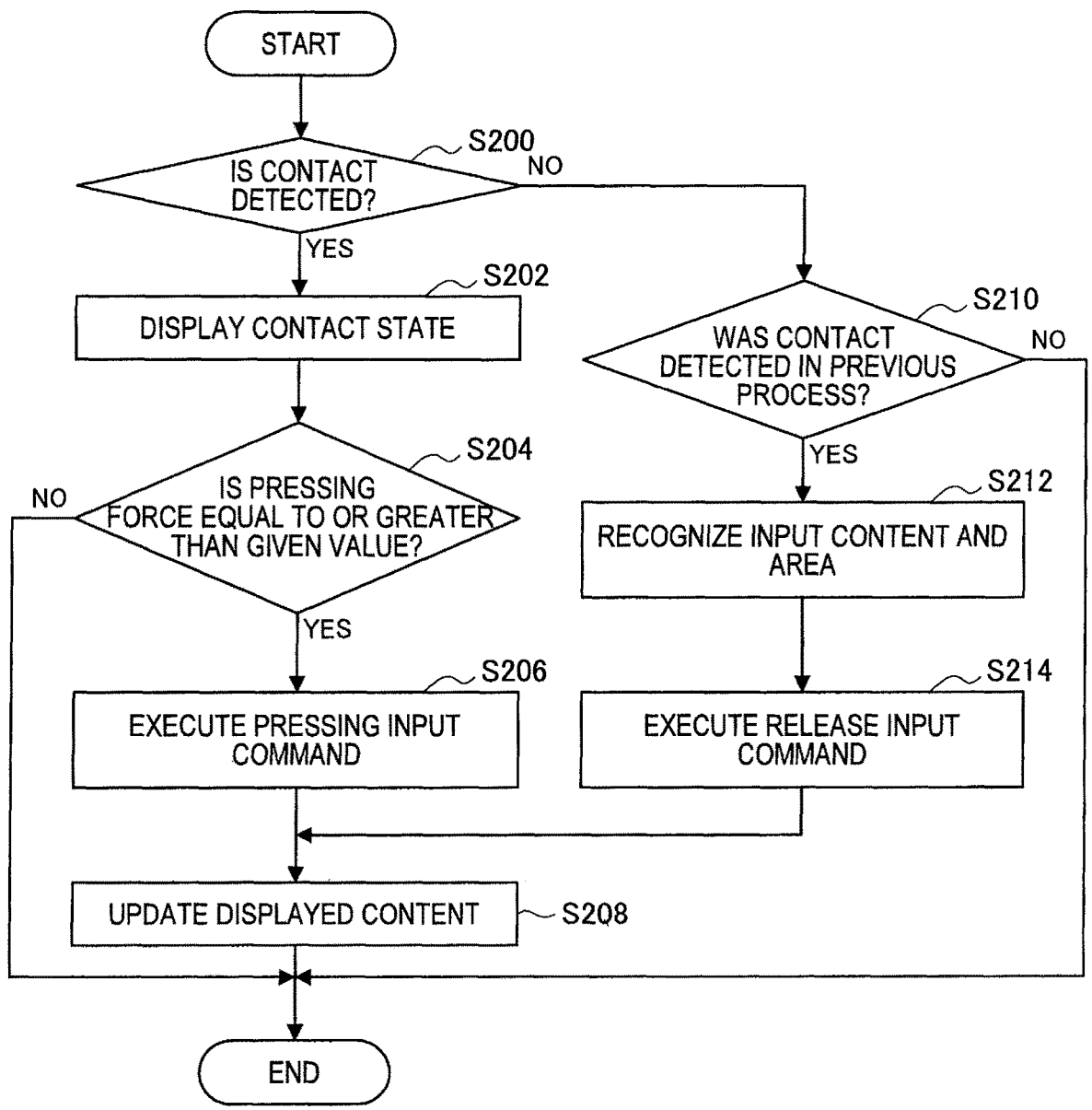
FIG. 12 is a flowchart showing an input manipulation process using the information processing device according to the second embodiment.

Next, an information processing device 200 and an input manipulation process using the information processing device 200 according to a second embodiment of the present invention will be described with reference to FIGS. 10 to 12. The information processing device 200 according to the present embodiment includes, as detection units, a position detection unit 212 capable of at least detecting that a manipulating body contacts a manipulation surface, and a pressure detection unit 214 capable of detecting pressing force with which the manipulating body presses the manipulation surface. The information processing device 200 judges a position state and a pressed state of the manipulating body based on detection results of such detection units, and determines an input operation to be executed.

Hereinafter, a configuration of the information processing device 200 and an input manipulation process in the information processing device 200 will be described in detail. FIG. 10 is an illustrative diagram showing a detection pattern in the information pressing device 200 according to the present embodiment. FIG. 11 is a block diagram showing a functional configuration of the information processing device 200 according to the present embodiment. FIG. 12 is a flowchart showing an input manipulation process using the information processing device 200 according to the present embodiment. A detailed description of the same configuration and process in the present embodiment, as those in the first embodiment will be omitted.

Description of Input Detection Pattern

First, a detection pattern of the manipulating body relative to the manipulation surface in the information processing device 200 according to the present embodiment will be described. The information processing device 200 includes a position detection unit (reference numeral 212 of FIG. 11) capable of detecting contact of the manipulating body with the manipulation surface, and a pressure detection unit (reference numeral 214 of FIG. 11) capable of detecting pressing force of the manipulating body against the manipulation surface. The information processing device 200 judges whether the user is inputting manipulation information based on detection results of the detection units and enables a manipulation according to the judgment result.

Figure 10:
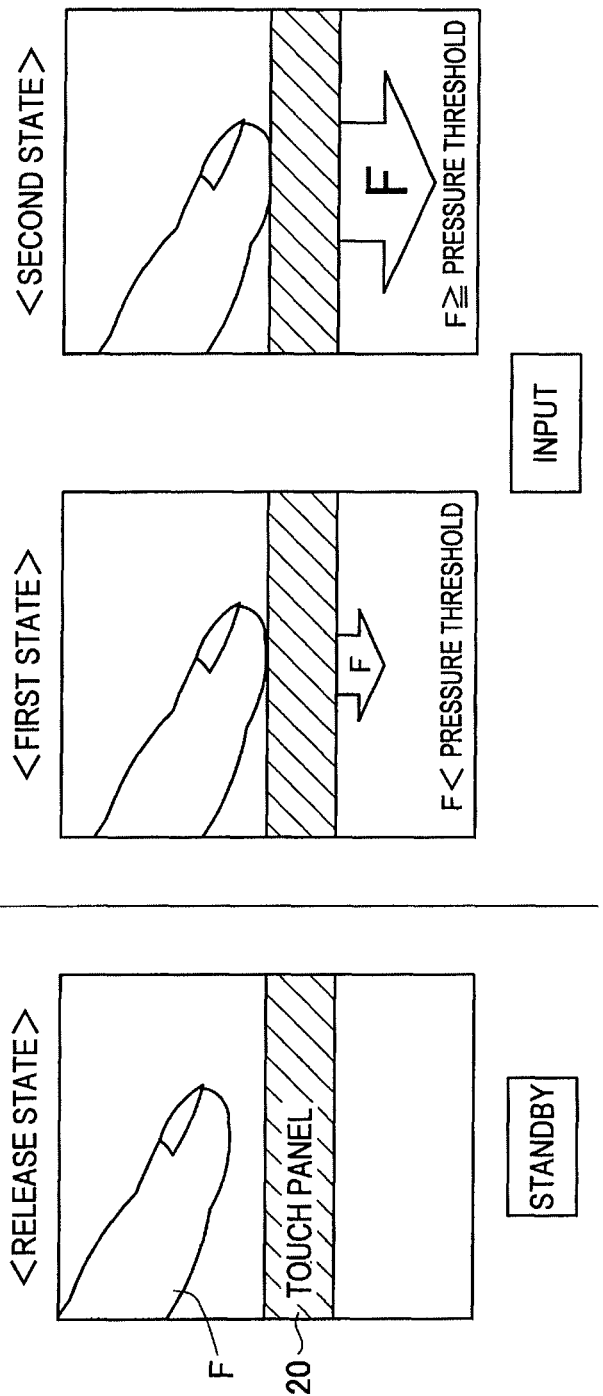
FIG. 10 is an illustrative diagram showing a detection pattern in an information processing device according to a second embodiment of the present invention.

In the present embodiment, three input states judged by the information processing device 200 are defined as shown in FIG. 10. First, a state in which a finger F is separated from a surface (manipulation surface) of a touch panel 20, i.e., a state in which the finger F does not contact the surface of the touch panel 20, is defined as a release state. Further, a state in which the finger F contacts the surface of the touch panel 20, but pressing force to press the touch panel 20 is equal to or smaller than a given value is defined as a first state. A state in which the finger F contacts the surface of the touch panel 20 and the pressing force to press the touch panel 20 is greater than the given value is defined as a second state. In this case, a state in which the finger F is in the release state is defined as a standby state, and a state in which the finger F is in the first state or the second state is defined as an input state.

The information processing device detects a position relationship between the finger F and the surface of the touch panel 20 using the detection units and judges any one of the three states. Each state or a change of the state corresponds to a given input manipulation. The information processing device executes an input manipulation corresponding to the state of the finger F. Accordingly, the user can switch the input manipulation by contacting the finger F with the surface of the touch panel 20, releasing the finger F from the surface of the touch panel 20, or changing pressing force to press the surface. Thus, enabling a plurality of input manipulations in a series of operations reduces a user manipulation load. Hereinafter, a configuration of such an information processing device and a manipulation process in the information processing device will be described in detail.

Functional Configuration of Information Processing Device

Next, a functional configuration of the information processing device 200 according to the present embodiment will be described with reference to FIG. 11. The information processing device 200 according to the present embodiment includes an input display unit 210, a state judgment unit 220, an input manipulation determination unit 230, an input processing unit 210, and a storage unit 250, as shown in FIG. 11.

The input display unit 210 is a functional unit for displaying information and inputting information, and includes a position detection unit 212, a pressure detection unit 214, and a display unit 216. The position detection unit 212 is a detection unit for detecting a value of capacitance changed according to whether the manipulating body has contacted a manipulation area where the position detection unit 212 is provided. It is preferable that the position detection unit 212 of the present embodiment can at least detect that the manipulating body has contacted the manipulation surface. When the manipulating body contacts the display surface, the capacitance value increases in comparison with the manipulating body not contacting the display surface. When the capacitance value detected by the position detection unit 212 exceeds a given value, the manipulating body may be judged as contacting the display surface. The position detection unit 212 outputs the detected capacitance value as the detection result to the state judgment unit 220.

The pressure detection unit 214 is a detection unit for detecting pressure with which the manipulating body presses the manipulation area, and corresponds to the pressure sensor 106 of FIG. 2. The pressure detection unit 214 outputs an electrical signal according to a size of the pressure, as the detection result, to the state judgment unit 220. The display unit 216 is an output means for displaying information that is display-processed by the input processing unit 240, and corresponds to an output device corresponding to the display device 104 of FIG. 2.

The state judgment unit 220 judges a position state of the manipulating body relative to the manipulation surface based on the detection results input from the position detection unit 212 and the pressure detection unit 214. When the capacitance value is input as the detection result from the position detection unit 212, the state judgment unit 220 judges whether the manipulating body contacts the manipulation surface, i.e., the manipulating body is in the release state or the first state shown in FIG. 10, based on the size of the capacitance value. The state judgment unit 220 refers to a given value indicating the capacitance value in the contact state stored in the storage unit 250 and compares the given value with the capacitance value detected by the position detection unit 212. Based on a size relationship therebetween, the state judgment unit 220 may judge the position state of the manipulating body (i.e., whether the manipulating body contacts the manipulation surface). The state judgment unit 220 outputs the judgment result to the input manipulation determination unit 230.

Further, the state judgment unit 220 judges a pressed state of the manipulating body against the manipulation surface based on the detection result input from the pressure detection unit 214. When the size of the pressing force is input as the detection result from the pressure detection unit 214, the state judgment unit 220 judges whether the pressing force with which the manipulating body presses the manipulation surface is greater than a given pressure threshold. Accordingly, the state judgment unit 220 may judge whether the pressed state of the manipulating body is the first state or the second state. The pressure threshold is stored in the storage unit 250 in advance. The state judgment unit 220 outputs the judgment result to the input manipulation determination unit 230.

The input manipulation determination unit 230 determines an input manipulation to be executed, based on the judgment result input from the state judgment unit 220. The input manipulation determination unit 230 specifics an input manipulation corresponding to the position state or the pressed state of the manipulating body, or a change of the state of the manipulating body by referring to the storage unit 250, and determines execution of the input manipulation. The input manipulation determination unit 230 outputs the determined information to the input processing unit 240.

The input processing unit 240 performs a process of executing the input manipulation. The input processing unit 240 executes the input manipulation determined by the input manipulation determination unit 230 based on input information input from the input display unit 210. When information displayed on the display unit 216 is changed by the execution of the input manipulation, display-processed information is output from the input processing unit 240 to the display unit 216.

The storage unit 250 stores various set information used to determine the input manipulation to be executed, and corresponds to the non-volatile memory 103 shown in FIG. 2. The set information includes, for example, a given value for judging the position state of the manipulating body relative to the manipulation surface, the pressure threshold, correspondence information indicating a correspondence between the position state of the manipulating body and the input manipulation, and the like.

The information processing device 200 according to the present embodiment may have the hardware configuration as shown in FIG. 2, which has been described in the first embodiment. The information processing device 200 according to the present embodiment includes both the touch sensor 105 and the pressure sensor 106.

Next, the input manipulation process using the information processing device 200 according to the present embodiment will be described with reference to FIG. 12. Even in the input manipulation process of the present embodiment, an input manipulation corresponds to each of the release state, the first state, and the second state shown in FIG. 10, and a plurality of input manipulations can be executed in a series of operations performed by moving the manipulating body, similar to the first embodiment. Hereinafter, the input manipulation process according to the present embodiment will be described in connection with the sentence input and input area movement using the input manipulation process described in the first embodiment Sentence Input Using Input Manipulation Process First, a case in which the input manipulation process according to the present embodiment is applied to the sentence input manipulation in the input display unit 300 of the information terminal shown in FIG. 4 will be described. A user can input characters to the destination input area 302, the subject input area 304, and the text input area 306 by manipulating the software keyboard 310, as shown in FIG. 4. In the software keyboard 310 according to the present embodiment, when the finger F contacts the key, the key is displayed to protrude toward the finger tip of the finger F, as in the first embodiment. Where the position detection unit 212 is capable of detecting a proximity state of the finger F, the display of the key may be changed when the finger F is in proximity to the key. When the user presses the manipulation surface with pressing force greater than a green pressure threshold, i.e., when the finger F is in the second state, a character corresponding to the key that the finger F contacts is input to the input area.

The user moves the finger F to a key corresponding to a character input from the software keyboard 310 and presses the key in a state in which the finger F is in a contact state. By doing so, the character is input. If the space is input, the finger F is separate from the manipulation surface to be in the release state. When the information processing device 200 detects that the state of the linger F is changed from the input state (the first state or the second state) to the standby state (release state), the information processing device 200 inputs the space to the input area. Thus, even in the present embodiment, the space input manipulation corresponds to the change in the state of the finger F, thus reducing the load of the input manipulation in inputting the sentence.

More specifically, the detection results are input from the position detection unit 212 and the pressure detection unit 214 of the information processing device 200 to the state judgment unit 220 at a given timing. When the detection results are input, the state judgment unit 220 judges whether the finger F is in contact with the manipulation surface (step S200). The state judgment unit 220 refers to a given value as a capacitance value when the manipulating body is in contact with the manipulation surface, which is stored in the storage unit 250, and compares the given value with the detection result of the position detection unit 212.

When the detection result is greater titan the given value, the contact state (the first state) indicating that the finger F is in contact with the manipulation surface is displayed (step S202). In the contact state, in the present embodiment, a key of the software keyboard 310 with which the finger F is in contact is displayed to protrude toward the finger tip of the finger F. In this case, the state judgment unit 220 stores information indicating that the finger F is in the contact state, as state information, in a memory (not shown). The state information is information indicating the position state or a pressed state of the finger F when each input manipulation process is executed, and is history-managed.

Further, the state judgment unit 220 judges whether the finger F is pressing the manipulation surface with pressing force above the given threshold pressure (step S204). The state judgment unit 220 refers to the pressure threshold stored in the storage unit 250 and compares the pressure threshold with the detection result of the pressure detection unit 214. When the detection result is above the pressure threshold, the state judgment unit 220 judges that the finger F is pressing the manipulation surface above the pressure threshold (the second state), and executes a pressing input command (step S206).

The pressing input command is an instruction for executing an input manipulation that is executed when the finger F presses the manipulation surface above the pressure threshold. When the state judgment unit 220 judges that pressing force of the finger F is above the pressure threshold, the input manipulation determination unit 230 having received the judgment result specifies an input manipulation to be executed when the position state of the finger F is in the second state by referring to the storage unit 250, and instructs the input processing unit 240 to execute such an input manipulation. In the present embodiment, when the finger F has pressed the manipulation surface above the given pressure threshold, a character of a key that the finger F is pressing is selected. When the character is selected, the input processing unit 240 displays the selected character on the display unit 216 and updates displayed content (step S208). In this case, the state judgment unit 220 updates state information stored in a memory (not shown) and records that the finger F is in the second state. When it is judged in step S204 that the pressing force is not equal to or greater than the pressure threshold, the process is terminated with the contact state being displayed.

Returning to S200, when the detection result of the position detection unit 212 is equal to or smaller than the given value, the state judgment unit 220 judges that the finger F is not in contact with the manipulation surface. In this case, the state judgment unit 220 stores information indicating that the finger F is in the release state, as state information, in a memory (not shown). The state judgment unit 220 confirms whether the finger F was in the contact state in a previous input manipulation process (step S210). The state judgment unit 220 can confirm whether the finger F was in the contact state in the previous input manipulation process based on the state information stored in the memory. When the finger F was in the contact state in the previous input manipulation process, the input manipulation determination unit 230 judges that the state of the finger F is changed from the contact state to the release state, and specifies an input manipulation executed in the relevant situation by referring to the storage unit 250.

In the present embodiment, when the finger F is changed from the input state (the first state or the second state) to the standby state (release state), the space input manipulation is executed. Here, the input processing unit 240 recognizes previously input content and the input area (step S212). A space input position is confirmed by recognizing the input area, and whether a character string including the input characters is a meaningful character string is confirmed by recognizing the input content. Accordingly, when the meaningful character string is input, space input is performed in a relevant release state, such that the space is not carelessly input during character input.

Thus, the input processing unit 210 executes a release input command, which is an instruction for executing the input manipulation when the finger F has come into the release suite (step S214) and inputs the space to the input area of the display unit 216 (step S208). On the other hand, when it is determined in step S210 that the finger F has been in the release state even in the previous input manipulation process, the process is terminated without updating the displayed content. The input manipulation process shown in FIG. 2 is repeatedly performed each time the detection results are input from the position detection unit 212 and the pressure detection unit 214 to the state judgment unit 220.

The input manipulation process in the information processing device 200 according to the present embodiment has been described. Through such an input manipulation process, for example, in the example shown in FIG. 4, when a sentence is input to the text input area 306, the key of the software keyboard 310 is pressed by the finger F with force above the pressure threshold to select a character to be input, and then the input is determined with pressing force to press the manipulation surface that is smaller than the pressure threshold. In this case, the finger F may continue to contact the manipulation surface. For example, when a character string "This" is input and then the space is input the space can be input without selecting the space key by releasing the finger F from the manipulation surface to be in the release state. Then, the finger F contacts a key of a character to be input next and the character is input subsequent to the space. Thus, the space input manipulation corresponds to the operation to change the finger F from the input state to the standby state, thus reducing the load of the input manipulation to select the key.

Further, even in the present embodiment, the spell check for the input character string may be performed at a timing when the state of the finger is changed from the input state to the standby state and the space input is performed, as in the first embodiment.

Movement of Input Area Using Input Manipulation Process

Next a case in which the input manipulation process of the present embodiment is applied to the movement manipulation for the input area to be activated shown in FIG. 8, which has been described in the first embodiment, will be described. That is, an input manipulation to move the input area according to the position state and the pressed state of the finger F relative to the manipulation surface is executed. Even in the present example, the state judgment unit 220 of the information processing device 200 can detect three states shown in FIG. 8 based on the detection results of the position detection unit 212 and the pressure detection unit 214. Here, the release state in which the finger F is separated from the manipulation surface is defined as a standby state, and the first state and the second state in which the finger F is in contact with the manipulation surface are defined as input states. Character input using the software keyboard 310 may be performed by setting the finger F as an input state in the active input area. The information processing device 200 may execute the movement manipulation for the active input area when the finger F is changed from the input state to the standby state.

The order to determine active input areas through the input area movement manipulation is set in the information processing device 200 in advance. It is assumed that movement is performed in order of the destination input area 302, the subject input area 304, and the text input area 306. As shown in FIG. 8, the user inputs a character to the destination input area 302 using the software keyboard 310 and then separates the finger F from the manipulation surface to enter the standby state. In this case, since the position state of the finger F is changed from the input state to the standby state, the input manipulation determination unit 230 of the information processing device 200 instructs the input processing unit 240 to activate the subject input area 304. The input processing unit 240 performs a display process to set the input area as the subject input area 304, and displays it on the display unit 216.

When the subject input area 304 becomes the active input area, the user is similarly allowed to input a subject to the subject input area using the software keyboard 310. When the input is terminated, the finger F moves to the standby state. Accordingly, when the active input area is changed from the subject input area 304 to the text input area 306, the user is allowed to input characters to the text input area 306. Thus, it is possible to perform the movement manipulation on the input area to be activated by moving the position of the finger F between the input state and the standby state on the software keyboard 310 without moving the finger F from the software key board 310 to the input area.

The information processing device 200 and the input manipulation process using the information processing device 200 according to the present embodiment have been described. According the present embodiment, the position detection unit 212 capable of detecting contact of the manipulating body with the manipulation surface and the pressure detection unit 214 capable of detecting pressing force are included to execute the input manipulation according to the state of the manipulating body. Accordingly, it is possible to reduce the load of the input manipulation.

3. Others

Execution of Space Input and Input Area Movement

In the first and second embodiments, an example in which any one process of space input or input area movement is executed when the state of the finger F is changed from the input state to the standby state has been described. Further, processes of the space input and the input area movement may be executed in a series of manipulations from the state of the finger F. In this case, the processes of the space input and the input area movement may be discriminated according to a method of a change from the input state to the standby state.

For example, two processes may be discriminated according to a movement direction of the finger F when the finger F is changed from the input state to the standby state. When the finger F is released from the manipulation surface, the finger F may be moved substantially vertically upward or obliquely upward from the manipulation surface. Here, a release direction of the finger F is detected by the position detection unit, and for example, the space input process may be executed when the finger F is moved substantially vertically upward, and the input area movement process may be executed when the finger F is moved obliquely upward from the manipulation surface. In this case, it is necessary to provide a position detection unit capable of detecting a shape of the manipulating body. Such a position detection unit may be, for example, a capacitance type sensor.

Alternatively, the two processes may be discriminated according to a time until the finger is changed from the input state to the standby state. For example, when the finger F is changed into the standby state again before a given time (e.g., about 0.5 seconds) elapses after the finger F comes into the input state, the space input process is executed. Meanwhile, when the finger F comes into the input state, a given time elapses after a last character is input, and then the finger F is changed into the standby state, a process of moving the input area is executed.

Alternatively, the pressing force to press the manipulation surface may be detected by the pressure detection unit and the two processes may be discriminated according to a size of maximum pressing force in the input state. For example, the pressing force of the manipulating body in the input state before the manipulating body comes into the release state is detected and maximum pressing force when the manipulating body is in the input state is detected. When the manipulating body is changed from the input state to the release state, the information processing device judges whether the size of the maximum pressing force is equal to or greater than the given value. When the maximum pressing force is equal to or smaller than the given value, the space input process is executed, and when the maximum pressing force is greater than the given value, a process of moving the input area is executed. For example, the given value may be greater than the pressure threshold in the second embodiment. Accordingly, when the user weakly puts the finger F toward the manipulation surface and then releases the finger F, the space input process may be executed, and when the user strongly puts the finger F toward the manipulation surface and then releases the finger F, the input area movement process may be executed.

Thus, the processes of the space input and the input area movement can be discriminated according to the method of a change from the input state to the standby state. Accordingly, it is possible to reduce the user manipulation load.

The position detection unit and the pressure detection unit of the information processing device according to the present embodiment can simultaneously detect positions and pressing forces of one or a plurality of manipulating bodies. When position states and pressed states of a plurality of manipulating bodies (e.g., two or more fingers) are detected by the respective detection units, logical product is applied, and a corresponding process is executed when all the manipulating bodies satisfy the judgment condition shown in FIG. 5 or 12. For example, where the space input process is executed when the state of the manipulating body is changed from the input state to the standby state, all fingers need to be in the release state in a state in which a plurality of fingers have been detected by the position detection unit or the pressure detection unit. However, in a terminal having a size allowing the software keyboard to be manipulated by both hands, contact of all fingers with the manipulation surface to input the space upon key input may further improve manipulability than release of all the fingers. In such a case, a given process may be executed by contacting all the fingers with the manipulation surface instead of releasing all the fingers.

Malfunction Prevention Process

As in the above embodiment, when the input manipulation is executed based on the position state or the pressed state of the finger F, the space may be input or the input area may be moved at a timing not desired by a user according to the detection performance of the detection unit or manipulation accuracy of a user. Here, a judgment as to whether to execute the manipulation process may be made before the manipulation process execution in order to prevent the manipulation process from being executed at a timing not desired by a user.

For example, in the character input using the software keyboard 310, when the state of the finger F is changed from the input state to the standby state, a determination may be made as to whether the character string input so far is a meaningful character string. The determination as to whether the input character string is a meaningful character string may be made by performing a matching process to check whether a word matching the input character string is registered in a word dictionary previously stored in the information processing device by referring to the word dictionary. Accordingly, it is possible to prevent malfunction that a process such as space input or input area movement is executed during word input.

Further, as a method of preventing the malfunction, when a process is executed according to a state of the manipulating body, information corresponding to the process may be output and the user may be notified of the execution of the process. For example, when the space input process is executed, sound may be output from a speaker, a reaction of the space key of the software keyboard may be displayed, or displaying for notification of space input may be performed. Thus, the user is notified of the process execution, such that the user can surely recognize that the process has been executed by a user manipulation and the malfunction has occurred.

Configuration of Detection Unit

In the information processing device, in order to acquire input manipulation information, the position detection unit for detecting proximity or contact of the manipulating body to or with the manipulation surface is provided in the first embodiment, and the position detection unit for detecting contact of the manipulating body with the manipulation surface and the pressure detection unit for detecting pressing force against the manipulation surface are provided in the second embodiment. A state of the manipulating body relative to the manipulation surface is judged using information that can be detected by the detection unit. The present invention is not limited to the configurations of the embodiments and, for example, the detection unit may include the position detection unit for detecting proximity or contact of the manipulating body to or with the manipulation surface and the pressure detection unit for detecting pressing force to the manipulation surface.

Accordingly, since states of more manipulating bodies can be detected, several input manipulations correspond to the state of the manipulating body or the change of the state, thus reducing the load of the input manipulation.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above embodiments, the states of the manipulating body are divided into the standby state as the release state, and an input state including the first state and the second state, but the present invention is not limited to such an example. For example, states included in the standby state and the input state may be properly set according to the detection performance of the detection unit, and a given process may correspond to each state or a change of the state.

Further, the executions of the character input process, the space input process, and the input area movement process according to the state of the manipulating body or the change of the state have been described in that characters are input in the above embodiments, but the present invention is not limited to such an example. For example, in the character input, when the state of the manipulating body is changed from the input state to the standby state, other processes such as a line break process or a search initiation process after character input to a search window may be executed. The line break process may be executed in combination with the space input process. For example, a last input character is judged, and when the last input character is a period, line break may be performed, and when the last input character is a character other than the period, a space may be input. Further, the input manipulation process using the information processing device of the present invention may be applied to other processes.

What is claimed is:

1. An information processing device comprising:
   text input processing circuitry configured to
      initiate display of a software keyboard in a first display area,
      initiate display of an input text in a second display area which is apart from the first display area,
      detect a first user operation and a second user operation toward a touch screen including the first display area and the second display area,
      input a text character corresponding to a touch position of a manipulating body and display the inputted text character in the second display area when the first user operation is detected in the first display area, and
      change a selected input area to be activated among a plurality of input areas when the second user operation is detected in the first display area without a user operation in the second display area, the plurality of input areas including a destination input area, a subject input area, and a body text input area, and the selected input area determining where text is to be input within the second display area,
   wherein the first user operation is different from the second user operation.

2. The information processing apparatus according to claim 1, wherein the text input processing circuitry changes the selected input area in accordance with a predetermined order set for the plurality of input areas.

3. The information processing apparatus according to claim 2, wherein when the second user operation is detected, the text input processing circuitry changes the selected input area in accordance with the predetermined order of the destination input area, the subject input area, and the text input area.

4. The information processing apparatus according to claim 1, wherein the text input processing circuitry changes the selected input area based on a predetermined elapsed time.

5. The information processing apparatus according to claim 1, wherein the text input processing circuitry changes the selected input area based on a detection of a plurality of manipulating bodies proximate to the touch screen.

6. The information processing apparatus according to claim 1, wherein the text input processing circuitry changes the selected input area based on a detection of a pressure of the manipulating body toward the touch screen.

7. The information processing apparatus according to claim 1, wherein the text input processing circuitry inputs the text character in the selected input area as part of a character string.

8. The information processing apparatus according to claim 7, wherein the text input processing circuitry is further configured to execute a spell check process for a previously input character string.

9. The information processing apparatus according to claim 1, wherein the text input processing circuitry is further configured to output a notification when the selected input area is changed.

10. The information processing apparatus according to claim 1, wherein the destination input area, the subject input area, and the body text input area comprise rectangular areas.

11. The information processing apparatus according to claim 1, wherein a direction of a movement of the first user operation is substantially vertical with respect to a surface of the touch screen and a direction of a movement of the second user operation is oblique with respect to the surface of the touch screen.

12. The information processing apparatus according to claim 11, wherein the oblique movement of the second user operation is detected by using a proximity detection with respect to the surface of the touch screen.

13. The information processing apparatus according to claim 1, wherein the first user operation comprises contact and release between the manipulating body and the touch screen.

14. The information processing apparatus according to claim 1, wherein the second user operation comprises movement of the manipulating body in a direction that is different from a direction of a movement of the first user operation with respect to a surface of the touch screen.

15. The information processing apparatus according to claim 1, wherein the selected input area is indicated as activated by a display process performed with respect to the selected input area.

16. An information processing method comprising:
    displaying a software keyboard in a first display area;
    displaying an input text in a second display area which is apart from the first display area;
    detecting a first user operation and a second user operation toward a touch screen including the first display area and the second display area;
    inputting a text character corresponding to a touch position of a manipulating body and displaying the inputted text character in the second display area when the first user operation is detected in the first display area; and
    changing a selected input area to be activated among a plurality of input areas when the second user operation is detected in the first display area without a user operation in the second display area, the plurality of input areas including a destination input area, a subject input area, and a body text input area, and the selected input area determining where text is to be input within the second display area,
    wherein the first user operation is different from the second user operation.

17. A non-transitory computer-readable medium having embodied thereon a program, which when executed by a computer causes the computer to execute a method, the method comprising:
    displaying a software keyboard in a first display area;
    displaying an input text in a second display area which is apart from the first display area;
    detecting a first user operation and a second user operation toward a touch screen including the first display area and the second display area;
    inputting a text character corresponding to a touch position of a manipulating body and displaying the inputted text character in the second display area when the first user operation is detected in the first display area; and
    changing a selected input area to be activated among a plurality of input areas when the second user operation is detected in the first display area without a user operation in the second display area, the plurality of input areas including a destination input area, a subject input area, and a body text input area, and the selected input area determining where text is to be input within the second display area,
    wherein the first user operation is different from the second user operation.

* * * * *